United States Patent [19]

Paterson et al.

[11] Patent Number: 4,639,730
[45] Date of Patent: Jan. 27, 1987

[54] EXCESSIVE TERRAIN CLOSURE WARNING SYSTEM

[75] Inventors: Noel S. Paterson, Bothell; Everette E. Vermilion, Seattle, both of Wash.

[73] Assignee: Sundstrand Data Control, Inc., Redmond, Wash.

[21] Appl. No.: 494,591

[22] Filed: May 13, 1983

[51] Int. Cl.⁴ .................. G08B 23/00; G01C 21/00; G06F 15/48

[52] U.S. Cl. .................. 340/970; 73/178 T; 340/969; 364/433; 342/5

[58] Field of Search .................. 340/959–960, 340/963–964, 967–968, 970, 973, 975, 977, 945; 364/427–430, 431.01, 433–435; 73/178 T, 178 H, 178 R; 102/206; 89/1.55; 343/7 TA; 244/75 R, 180

[56] References Cited

U.S. PATENT DOCUMENTS

| | | | |
|---|---|---|---|
| 3,703,844 | 11/1972 | Bleikamp, Jr. | 89/1.55 |
| 3,934,221 | 1/1976 | Bateman et al. | 73/178 R |
| 3,934,222 | 1/1976 | Bateman et al. | 73/178 R |
| 3,944,968 | 3/1976 | Bateman et al. | 73/178 R |
| 3,946,358 | 3/1976 | Bateman . | |
| 3,958,218 | 5/1976 | Bateman | 73/178 R |
| 3,958,219 | 5/1976 | Bateman et al. | 340/970 |
| 4,030,065 | 6/1977 | Bateman | 340/970 |
| 4,319,218 | 3/1982 | Bateman | 340/959 |
| 4,551,723 | 11/1985 | Paterson | 340/970 |

Primary Examiner—Donnie L. Crosland
Assistant Examiner—Brent A. Swarthout
Attorney, Agent, or Firm—Mason, Kolehmainen, Rathburn & Wyss

[57] ABSTRACT

A system for warning the pilot of an aircraft flying at low level, particularly over rising terrain, of an excessive closure condition that could result in controlled flight into terrain if left uncorrected. Specifically a warning system is disclosed that monitors the terrain closure rate of an aircraft under certain conditions. These conditions relate to the weapons not being armed, the aircraft flying between 100 and 1800 feet and the air speed exceeding 200 knots. When these conditions are met a warning is provided to the pilot that the terrain closure rate exceeds a predetermined safe limit for the radio altitude at which the aircraft is flying.

16 Claims, 2 Drawing Figures

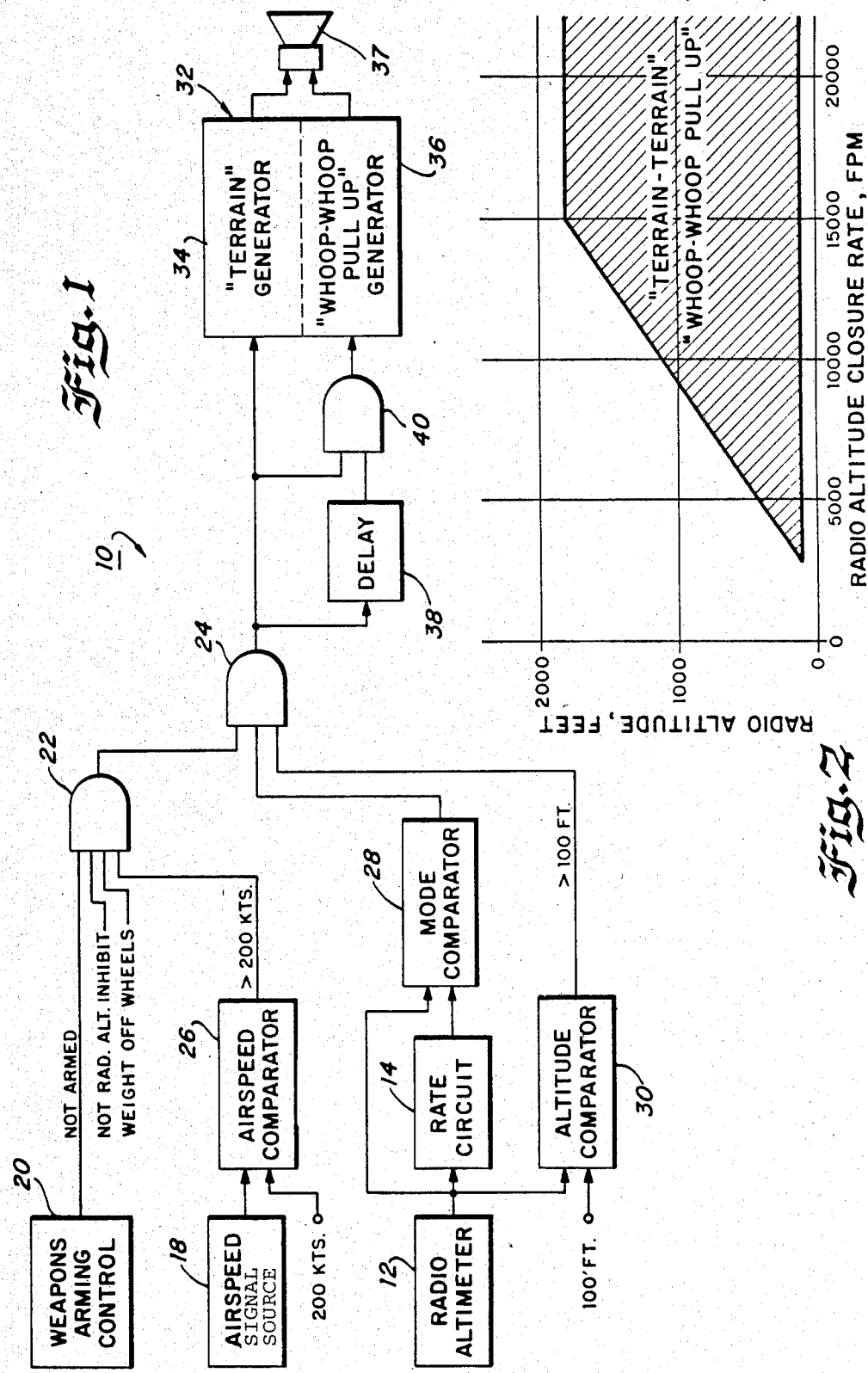

EXCESSIVE TERRAIN CLOSURE WARNING SYSTEM

BACKGROUND OF THE INVENTION

1. Field of the Invention

This invention relates generally to ground proximity warning systems for aircraft, and more particularly to systems that monitor the altitude above ground and the closure rate of the aircraft to determine a dangerous flight condition.

2. Description Of The Prior Art

Ground proximity warning systems that warn of a dangerous flight condition are known. Examples of such systems are disclosed in U.S. Pat. Nos. 3,934,221; 3,934,222; 3,944,968; 3,946,358 and 3,958,218, assigned to the assignee of the present invention. All of these systems monitor the radio altitude and the radio altitude closure rate, and generate a warning if the rate of closure rate is excessive for the altitude at which the aircraft is flying.

While these systems do provide a way to warn the pilot of a hazardous condition resulting from an excessive closure rate with terrain, these systems are designed for use in transport aircraft, and not for use in highly maneuverable, high performance tactical aircraft such as fighter or attack aircraft whose flight and operational characteristics are substantially different than those of transport aircraft. Consequently, the systems designed for transport aircraft can provide false warnings during certain normal operational conditions of a tactical aircraft, and provide no warning or an inadequate warning during other flight conditions

SUMMARY OF THE INVENTION

Accordingly, it is an object of the present invention to provide a ground proximity warning system that overcomes many of the disadvantages of prior art warning systems when applied to tactical aircraft.

It is another object of the present invention to provide an excessive terrain closure warning system that is particularly suitable for use in maneuverable, high performance aircraft such as fighter or attack aircraft.

It is yet another object of the present invention to provide an excessive closure rate warning system suitable for use in high performance aircraft that has the warning envelope tailored to meet the operational and performance characteristics of such aircraft.

It is yet another object of the present invention to provide an excessive closure rate warning system for fighter or attack aircraft having enabling and disabling logic that enables the warning function as a function of altitude, airspeed and the arming of the weapons to enable the system during low level navigation, and disables it during other phases of flight, such as tactical maneuvers wherein high closure rates are normally encountered, to minimize nuisance warnings.

The operational and flight characteristics of a high performance aircraft such as a fighter or an attack aircraft are considerably different than those of a transport aircraft. For example, it is quite common for a high performance tactical aircraft such as a fighter or attack aircraft to cruise at low level over various terrain including rising and falling terrain. Much of such cruising is done at high speed and at night, and consequently, it is possible for the pilot inadvertently to fly the aircraft into terrain, particularly if the aircraft is being flown over gradually rising terrain. Consequently, it is desirable to provide the pilot with a warning of an impending flight into terrain with sufficient time to permit him to take corrective action. However, systems designed for transport aircraft generally would not provide suitable warnings, since such aircraft typically do not fly at the relatively low cruise altitude flown by tactical aircraft. As a result, systems designed for transport aircraft would tend to give inadequate and false warnings, and such warnings would be a nuisance to the pilot.

Therefore, in accordance with a preferred embodiment of the invention, there is provided a system that monitors the closure rate of the aircraft when the weapons are not armed, the aircraft is flying between 100 and 1,800 feet, and the airspeed exceeds 200 knots, and provides a warning to the pilot if the radio altimeter rate exceeds a predetermined safe limit for the radio altitude at which the aircraft is flying.

DESCRIPTION OF THE DRAWING

These and other objects and advantages of the present invention will become readily apparent upon consideration of the following detailed description and attached drawing, wherein:

FIG 1 is a logical block diagram of the warning system according to the invention; and FIG. 2 is a graph of the radio altitude closure rate required to generate a warning as a function of radio altitude.

DETAILED DESCRIPTION OF THE PREFERRED EMBODIMENT

Referring now to the drawing, with particular attention to FIG. 1, there is illustrated an embodiment of the ground proximity warning system according to the invention generally designated by the reference numeral 10. The system 10 according to the invention is illustrated in logical block diagram form as a series of gates, comparators and the like for purposes of illustration; however, it should be understood that the actual implementation of the logic can be other than as shown in FIG. 1, with various digital and analog implementations being possible. The signals used by the system as described includes radio altitude, radio altitude rate, airspeed and a signal indicating whether the weapons are armed, along with various validity signals. Depending on the type of aircraft in which the warning system is installed, the signals shown in FIG. 1 can be obtained from individual instruments such as a radio altimeter 12, a radio altitude rate circuit 14, an airspeed signal source 18 such as an air data computer or airspeed indicator, a weapons arming control 20, and a discrete element indicating whether there is weight on the wheels. Alternatively, the signals can be obtained from a digital data bus in certain newer aircraft.

Because the system is designed to be operational during a cruise mode of operation of the aircraft, its operation is inhibited during other modes such as, for example, tactical modes or when the aircraft is on an approach to a landing to avoid possible false warnings caused by the relatively high closure rates encountered in such modes of operation. Consequently, the warning system is inhibited when the weapons are armed and when the airspeed of the aircraft is below a predetermined level, such as, for example 200 knots.

The inhibiting function is provided by a pair of AND gates 22 and 24. The AND gate 22 receives a signal from the weapons arming control 20 and inhibits the gate 24 when the weapons are armed. In addition, the gate 22 receives a signal from an airspeed comparator 26 that compares the airspeed signal received from the airspeed signal source 18 such as an air data computer or airspeed indicator with a reference signal representative of an airspeed of 200 knots and provides a signal indicative of whether the airspeed is above or below 200 knots. In addition, the gate 22 receives a signal indicating that the weight is off the wheels to enable the system only when the aircraft is flying. A signal indicating whether the radio altimeter is inhibited is also applied to the gate 22 and serves to disable the system in the event of a faulty radio altimeter.

If the weapons are not armed, and if the airspeed exceeds 200 knots, and assuming that the radio altimeter is not inhibited and the aircraft is flying, the gate 22 provides an enabling signal to the AND gate 24 to place the AND gate 24 under the control of a mode comparator 28 and an altitude comparator 30. The altitude comparator 30 receives signals representative of radio altitude from the radio altimeter 12 and compares the radio altitude signal with a reference signal representative of 100 feet of radio altitude. If the radio altitude exceeds 100 feet, the altitude comparator 30 applies an enabling signal to the gate 24 to enable the gate 24 and place it under the control of the mode comparator 28.

The function of the mode comparator 28 is to initiate the warning in the event that a dangerous flight condition exists. This is accomplished by comparing the altitude of the aircraft above ground, as determined by the radio altitude signal from the radio altimeter 12, with the radio altitude rate signal received from the rate signal received from the rate circuit 14. As long as the closure rate is not excessive for the radio altitude at which the aircraft is flying, no warning is generated, but if the closure rate should reach a value indicative of a dangerous flight condition, the mode comparator applies a signal to the gate 24 to fully enable the gate 24 to thereby cause a warning to be generated.

As previously discussed, for an aircraft maneuvering at low altitudes, the warning must be generated early enough to permit the pilot to take corrective action. In addition, the warning must be specific enough to communicate to the pilot exactly what specific action must be taken. Consequently, there is provided a voice warning generator 32 that generates such a specific warning and applies it, either directly or indirectly, to a loudspeaker 37, or other suitable transducer for providing the voice warning to the pilot. In the illustrated embodiment, the voice warning generator 32 supplies two specific warnings. The first warning is preferably an advisory warning, such as, for example, the word "TERRAIN" to indicate to the pilot the nature of the problem. The advisory warning is generated by a section 34 of the generator 32 that generates the word "TERRAIN". In addition, the generator 32 is provided with a second section 36 that generates a second warning, such as, for example, "WHOOP-WHOOP PULL UP" that advises the pilot of the exact course of action that must be taken to avoid a dangerous situation. The generator 32 is illustrated as a generator having a separate section for each warning, but a practical system would use a single generator having the two separate warnings programmed therein.

The warning generator 32 is controlled by the AND gate 24 along with a delay circuit 38 and an AND gate 40. When the AND gate 24 generates a warning initiation signal, the warning initiation signal is applied to the "TERRAIN" section 34 of the generator 32 as well as to a delay circuit 38. This causes the warning "TERRAIN" to be generated immediately. The delay circuit 38 delays the signal from the AND gate 24 by a predetermined amount of time, for example, in the present embodiment, 1.4 seconds, which is equal to the length of time that is required for the word "TERRAIN" to be repeated twice. Thus, the delay circuit 38 applies a signal to the gate 40 1.4 seconds after the generation of the warning initiate signal by the gate 24, thereby rendering the gate 40 operative to apply the initiation signal to the "WHOOP-WHOOP PULL UP" section 36 of the generator 32. This causes the "WHOOP-WHOOP PULL UP" signal to be generated in place of a "TERRAIN" warning after two repetitions of the "TERRAIN" warning.

Thus, the system according to the invention provides two repetitions of the word "TERRAIN" to inform the pilot of the specific dangerous condition that exists. If no response to that warning is made within 1.4 seconds, the warning "WHOOP-WHOOP PULL UP" is generated to inform the pilot of the specific corrective action that must be taken.

The relationship between radio altitude and the radio altitude closure rate that must exist to generate a warning is indicated by the shaded portion of the graph of FIG. 2. As is apparent from FIG. 2, whenever the aircraft is below 1,800 feet of radio altitude and above 100 feet of radio altitude, a warning is generated whenever the closure rate exceeds 15,000 feet per minute. The closure rate required to generate a warning decreases linearly with altitude until, at 100 feet altitude, a warning will be generated by a closure rate of only approximately 2,800 feet per minute.

The warning envelope illustrated in FIG. 2 has been optimized for the operation and flight characteristics of fighter/attack aircraft, such as the Fairchild A10, and is substantially different than the warning envelope used for transport aircraft. For example, because fighter/attack aircraft normally cruise at altitudes of only a few thousand feet, no warning is provided if the aircraft is flying above 1,800 feet above the ground. In addition, because fighter/attack aircraft are substantially more maneuverable than transport aircraft, the system permits substantially higher closure rates to be achieved before a warning is given. For example, at 1,500 feet of radio altitude, the system according to the invention permits a closure rate of approximately 12,500 feet per minute before a warning is generated, while a system designed for transport aircraft would generate a warning when the closure rate exceeded 3,500 feet per minute.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for providing a warning to a pilot of an aircraft of an excessive closure rate with terrain, comprising:
  means for providing signals representative of the altitude of the aircraft above the ground, the closure rate of the aircraft and the airspeed of the aircraft; and means responsive to signals representative of the altitude of the aircraft above ground, the closure rate of the aircraft and the air speed of the aircraft for generating a warning if the aircraft is below approximately 1800 feet above ground and has a closure rate in excess of 15,000 feet per minute and the airspeed of the aircraft is greater than a predetermined value;

wherein said aircraft is fitted with weapons, and wherein said warning system includes means responsive to the arming of the weapons of the aircraft for enabling the generation of said warning only when the weapons are not armed.

2. A warning system as recited in claim 1 wherein said predetermined airspeed is approximately 200 knots.

3. A warning system as recited in claim 1 wherein said altitude and closure rate signal responsive means further includes means for generating a warning at closure rates lower than approximately 15,000 feet per minute when said aircraft is less than approximately 1,800 feet from the ground.

4. A warning system as recited in claim 3 wherein said lower closure rate warning generating means includes means for generating said warning when the closure rate exceeds approximately 2,800 feet per minute at an altitude of approximately 100 feet above the ground.

5. A warning system as recited in claim 4 wherein said lower closure rate warning generating means includes means for increasing the closure rate necessary to generate the warning with altitude above ground until a closure rate of approximately 15,000 feet per minute is required to generate a warning at an altitude of approximately 1,800 feet above the ground.

6. A warning system as recited in claim 5 wherein said closure rate increases linearly with altitude between 100 and 1800 feet above ground.

7. A warning system as recited in claim 1 further including means for inhibiting the generation of the warning when the altitude of the aircraft is less than approximately 100 feet above the ground.

8. A warning system for providing a warning to the pilot of a tactical aircraft if the aircraft has an excessive closure rate with terrain, comprising:

means for providing a signal representative of the arming of the weapons of the aircraft;
means for providing a signal representative of the closure rate of the aircraft;
means for providing a signal representative of the altitude above ground of the aircraft; and
means responsive to said weapons arming signal providing means, said closure rate signal providing means and said altitude above ground signal providing means for generating a warning if the aircraft has its weapons not armed and has a closure rate in excess of a predetermined rate determined by the altitude above ground of the aircraft.

9. A warning system as recited in claim 8 further including means for providing a signal representative of the airspeed of the aircraft, wherein said warning signal providing means is responsive to said airspeed signal providing means for enabling the generation of said warning only if the airspeed of the aircraft exceeds a predetermined airspeed.

10. A warning system as recited in claim 9 wherein said predetermined airspeed is approximately 200 knots.

11. A warning system as recited in claim 8 further including means for preventing the generation of said warning when the aircraft is flying below approximately 100 feet above the ground.

12. A warning system as recited in claim 11 further including means for preventing the generation of said warning if the aircraft is flying above approximately 1,800 feet above the ground.

13. A warning system as recited in claim 8 further including means for generating said warning if the aircraft is flying below 1,800 feet above the ground and has a closure rate in excess of 15,000 feet per minute.

14. A warning system as recited in claim 13 further including means for generating said warning when the aircraft is flying at approximately 100 feet above the ground and has a closure rate in excess of approximately 2,800 feet per minute.

15. A warning system as recited in claim 14 wherein the closure rate necessary to generate said warning varies linearly with altitude between 100 and 1,800 feet.

16. A warning system as recited in claim 8 wherein said means for generating a signal representative of the altitude of the aircraft above the ground includes a radio altimeter.

* * * * *